(12) United States Patent
McFalls (10) Patent No.: US 6,186,548 B1
(45) Date of Patent: Feb. 13, 2001

(54) D-RING HEIGHT ADJUSTER

(75) Inventor: Bob L. McFalls, Shelby Township, MI (US)

(73) Assignee: TRW Vehicle Safety Systems Inc., Lyndhurst, OH (US)

( * ) Notice: Under 35 U.S.C. 154(b), the term of this patent shall be extended for 0 days.

(21) Appl. No.: 09/244,942

(22) Filed: Feb. 4, 1999

(51) Int. Cl.$^7$ ................................................ B60R 22/20
(52) U.S. Cl. .................... 280/801.2; 280/808; 297/483
(58) Field of Search ............................... 280/801.2, 808; 297/483

(56) References Cited

U.S. PATENT DOCUMENTS

| | | | |
|---|---|---|---|
| 4,917,403 | * 4/1990 | Gyoda et al. ..................... | 280/808 |
| 4,973,084 | * 11/1990 | Biller ................................ | 280/808 |
| 4,989,900 | * 2/1991 | Steinhuser ......................... | 280/808 |
| 5,167,428 | 12/1992 | Garret et al. ..................... | 280/808 |
| 5,482,325 | * 1/1996 | Moller et al. ..................... | 280/801.2 |
| 5,758,901 | * 6/1998 | Harenberg ........................ | 280/801.2 |
| 5,794,977 | 8/1998 | Frank ............................... | 280/801.2 |
| 5,931,502 | 8/1999 | Frank et al. ...................... | 280/801.2 |

FOREIGN PATENT DOCUMENTS 37 42389 A1 * 6/1989 (DE) .
44 12672 A1 * 10/1995 (DE) .
0249910 4/1990 (EP) .

* cited by examiner

Primary Examiner—Lanna Mai
Assistant Examiner—Ruth Ilan
(74) Attorney, Agent, or Firm—Tarolli, Sundheim, Covell, Tummino & Szabo L.L.P.

(57) ABSTRACT

A seat belt webbing guide height adjuster (10) includes a base (50) having a column (80) of openings (84, 86, 88) spaced along an axis (61). A carriage (120) is supported on the base (50) for movement along the axis (61) relative to the base. A seat belt webbing guide (24) is supported on the carriage (120). First and second latch parts (160, 180) on the carriage (120) are independently movable between a first condition not located in any one of the openings (84–88) and a second condition located in one of the openings to block axial movement of the carriage relative to the base (50). The first and second latch parts (160, 180) are configured and disposed on the carriage (120) so as to be capable of locating in the same opening (84–88) simultaneously. The height adjuster (10) also includes biasing means (210) for biasing the first and second latch parts (160, 180) into the second condition, and actuatable release means (200) for moving the first and second latch parts to the first condition. The first and second latch parts (160, 180) are movable from the second condition into the first condition in response to upward movement of the carriage (120) relative to the base (50) when the release means (200) is unactuated.

18 Claims, 6 Drawing Sheets

D-RING HEIGHT ADJUSTER

BACKGROUND OF THE INVENTION

1. Technical Field

The present invention relates to a vehicle occupant safety apparatus and, in particular, to a vehicle seat belt system including a seat belt webbing height adjuster and a pretensioner for taking up slack in the seat belt in the event of a vehicle collision.

2. Description of the Prior Art

Vehicle seat belt systems use seat belt webbing to restrain movement of a vehicle occupant. It is known to include a pretensioner in such a system. In the event of vehicle deceleration above a predetermined threshold level, such as occurs in a vehicle collision, the pretensioner is actuated to tension the belt webbing and to take up slack in the belt webbing.

It is also known to include a manually adjustable seat belt webbing height adjuster in a seat belt system. The belt webbing passes through a. seat belt webbing guide or D-ring that is supported on the height adjuster at a location adjacent to the shoulder of the vehicle occupant. The height adjuster enables the vehicle occupant to set the vertical position of the D-ring to one of several vertically spaced locking positions. In some height adjusters, the D-ring can, at times, be positioned vertically between locking positions.

Some seat belt systems include both a pretensioner and a height adjuster. When the pretensioner is actuated, the tensioned belt webbing exerts a strong downward force on the D-ring. If the pretensioner is actuated when the D-ring is not at a locking position, the D-ring is pulled downward along the height adjuster until it locks. It is desirable to ensure that the D-ring locks at the next available downward locking position and does not skip past one or more locking positions before engaging.

U.S. Pat. No. 5,794,977 describes a height adjuster which has two columns of projections in a rail affixed to the vehicle side structure. The height adjuster also has two corresponding latches which are engageable with the projections to lock the height adjuster. The latches and projections are staggered so as to prevent skipping past one or more locking positions before engaging.

U.S. Pat. No. 5,167,428 describes a height adjuster having a single column of vertically spaced openings in a rail, and a carriage having a pair of vertically spaced pins engageable in the openings. In this height adjuster, a lever must be actuated to pull the pins out of the openings in order to adjust the carriage upward along the rail.

SUMMARY OF THE INVENTION

The present invention is a seat belt webbing height adjuster comprising a base having a column of openings spaced along an axis. A carriage is supported on the base for movement along the axis relative to the base. A seat belt webbing guide is supported on the carriage. A first latch part on the carriage is movable between a first condition in which the first latch part is not located in any one of the openings and a second condition in which the first latch part is located in one of the openings to block axial movement of the first latch part and the carriage relative to the base. A second latch part on the carriage is movable between a first condition in which the second latch part is not located in any one of the openings and a second condition in which the second latch part is located in one of the openings to block axial movement of the second latch part and the carriage relative to the base. The first and second latch parts are configured and disposed on the carriage so as to be capable of locating in the same opening simultaneously. The height adjuster also includes biasing means for biasing the first and second latch parts into the second condition and actuatable release means for moving the first and second latch parts to the first condition. The first and second latch parts are movable from the second condition into the first condition in response to upward movement of the carriage relative to the base when the release means is unactuated.

BRIEF DESCRIPTION OF THE DRAWINGS

Further features of the present invention will become apparent to one skilled in the art to which the present invention relates from reading the following specification with reference to the accompanying drawings, in which.

DESCRIPTION OF PREFERRED EMBODIMENTS OF THE INVENTION

Figures 1, 2:
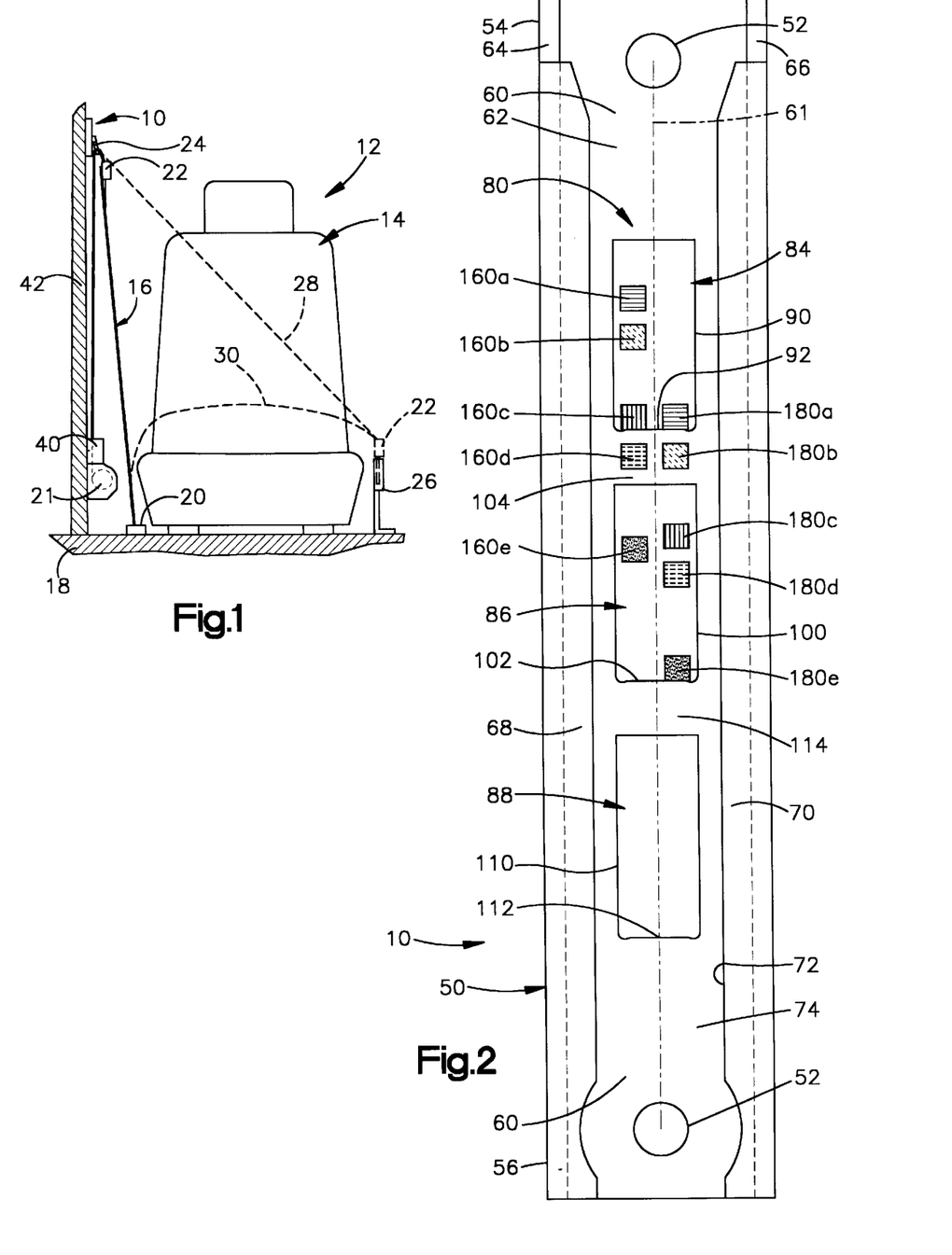
FIG. 1 is a schematic illustration of a vehicle seat belt system including a seat belt webbing guide height adjuster constructed in accordance with the present invention.
FIG. 2 is a schematic illustration showing different locking positions of the height adjuster of FIG. 1.
Figure 3:
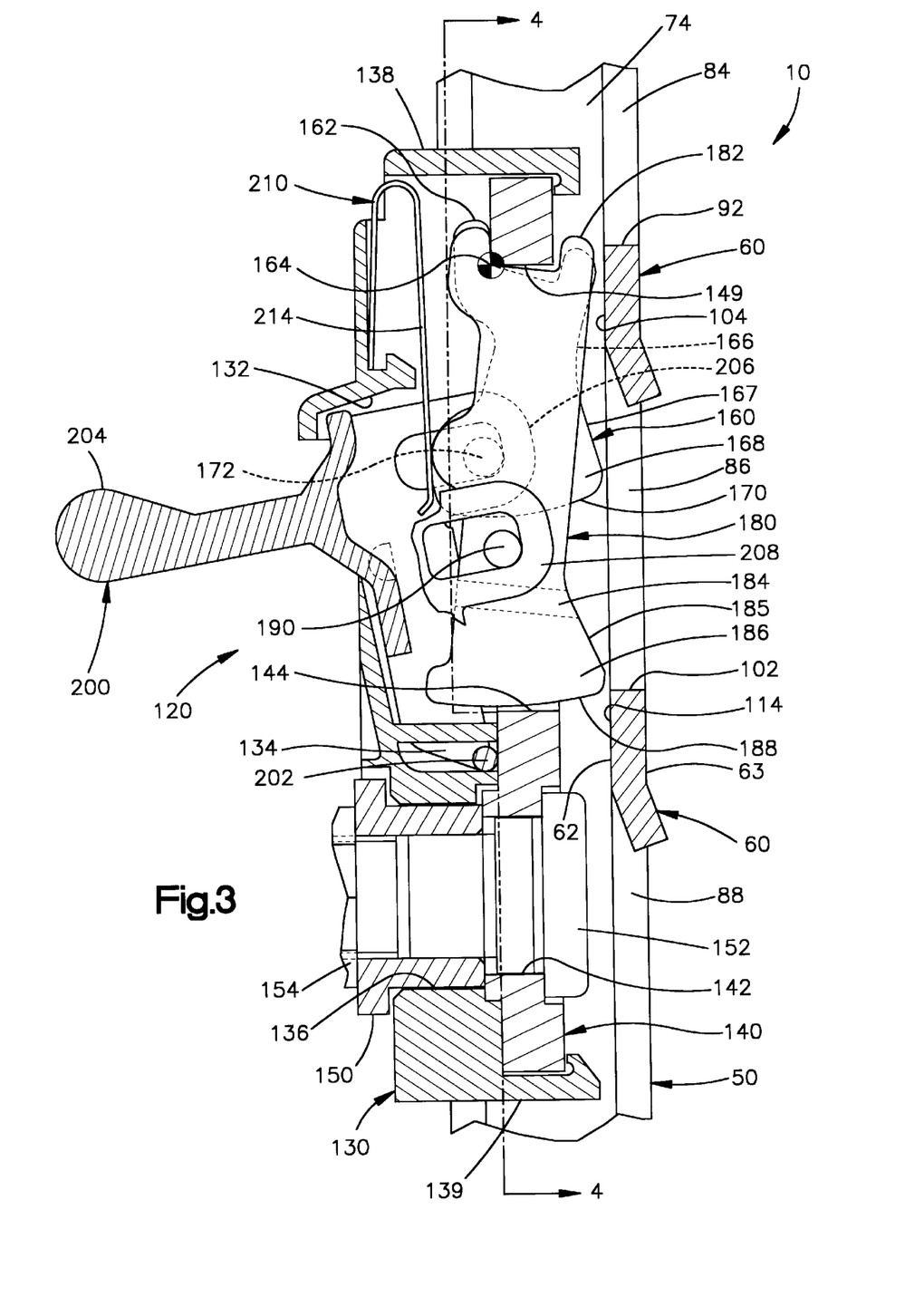
FIG. 3 is an enlarged view of the height adjuster in FIG. 1 in an actuated condition.

The present invention relates to a vehicle seat belt webbing guide height adjuster. As representative of the present invention, FIG. 1 illustrates a vehicle seat belt webbing guide height adjuster 10. The height adjuster 10 is incorporated in a three-point continuous loop seat belt system 12 for use in restraining an occupant of a vehicle.

During operation of the vehicle, the occupant of the vehicle sits on a seat 14 in the vehicle. A length of seat belt webbing 16 is extensible about the vehicle occupant. One end of the length of belt webbing 16 is anchored to the vehicle body 18 at an anchor point 20 located on one side of the seat 14. The opposite end of the belt webbing 16 is attached to a retractor 21 which is secured to the vehicle body on the same side of the seat 14.

Intermediate its ends, the belt webbing 16 passes through a tongue assembly 22 and a seat belt webbing guide or D-ring 24 that is located above the retractor 21 and the anchor point 20. The D-ring 24 is supported on the height adjuster 10 in a manner described below. When the seat belt system 12 is not in use, the belt webbing 16 is wound on the retractor 21 and is oriented generally vertically on the one side of the seat 14, as shown in solid lines in FIG. 1.

To engage the seat belt system 12, the tongue assembly 22 is manually grasped and is pulled across the lap and torso of the occupant sitting in the seat 14. As the tongue assembly 22 is pulled across the lap and torso of the occupant, the tongue assembly moves along the belt webbing 16, and the belt webbing is unwound from the retractor 21. When the belt webbing 16 has been pulled across the lap and torso of the occupant, the tongue assembly 22 is connected with a buckle 26, as shown in dashed lines in FIG. 1. The buckle 26 is connected to the vehicle body 18 and is disposed on the side of the seat 14 opposite the anchor point 20. When the seat belt system 12 is thus buckled, the length of belt webbing 16 is divided by the tongue assembly 22 into a torso portion 28 which extends across the torso of the occupant and a lap portion 30 which extends across the lap of the occupant.

The seat belt system 12 includes a pretensioner 40 connected with the belt webbing 16. The pretensioner 40 is disposed adjacent to, or may be incorporated in, the retractor 21. The pretensioner 40 is actuatable to tension the belt webbing 16 to take up slack in the belt webbing.

The D-ring height adjuster 10 (FIGS. 2–6) includes a rail or base 50 which is secured to a portion of the vehicle, such as the vehicle B-pillar 42, by fasteners (not shown) extending through a pair of fastener openings 52. The base 50 could, alternatively, be formed as a portion of the vehicle itself. The base 50 extends generally vertically in the vehicle and has an upper end portion 54 and an opposite lower end portion 56.

The base 50 is preferably formed from steel with a generally C-shaped cross-sectional configuration as viewed from above. The base 50 includes a back wall 60 which extends parallel to an axis 61 of the height adjuster 10. The back wall 60 has parallel inner and outer major side surfaces 62 and 63. Spaced, parallel side walls 64 and 66 of the base 50 extend outward from the back wall 60.

Front walls 68 and 70 of the base 50 are spaced from the back wall 60 and extend toward each other from the side walls 64 and 66, respectively, to define an axially extending slot 72 in the base 50. The walls 60, 64, 66, 68 and 70 of the base 50 define an axially extending central passage 74 in the base. The slot 72 opens into the central passage 74.

The base 50 includes a single column 80 of locking features. In the preferred embodiment, the locking features 80 are latch openings in the back wall 60 of the base 50. The column 80 of latch openings is located on the axis 61 and includes, in the illustrated embodiment, three latch openings—an upper latch opening 84, a middle latch opening 86, and a lower latch opening 88. The latch openings 84–88 extend between the inner and outer major side surfaces 62 and 63 of the back wall 60 of the base 50.

The three latch openings 84–88 are identical in configuration. The upper latch opening 84 has a rectangular configuration defined by a generally rectangular edge surface 90. The edge surface 90 has a lower end portion 92 oriented perpendicular to the axis 61. The lower end portion 92 of the edge surface 90 forms the lower boundary of the upper latch opening 84.

The middle latch opening 86 is disposed vertically below the upper latch opening 84. A portion 104 (FIGS. 2 and 3) of the inner major side surface 62 of the back wall 60 extends between the upper and middle latch openings 84 and 86. The middle latch opening 86 has a rectangular configuration defined by a generally rectangular edge surface 100. The edge surface 100 has a lower end portion 102 oriented perpendicular to the axis 61. The lower end portion 102 of the edge surface 100 forms the lower boundary of the middle latch opening 86.

The lower latch opening 88 is disposed vertically below the middle latch opening 86. A portion 114 (FIGS. 2 and 3) of the inner major side surface 62 of the back wall 60 extends between the middle and lower latch openings 86 and 88. The lower latch opening 88 has a rectangular configuration defined by a generally rectangular edge surface 110. The edge surface 110 has a lower end portion 112 oriented perpendicular to the axis 61. The lower end portion 112 of the edge surface 110 forms the lower boundary of the lower latch opening 88.

The height adjuster 10 includes a carriage 120 (FIGS. 3–5) which is slidable axially along the base 50. The carriage 120 supports the D-ring 24 for vertical sliding movement along the base 50. The carriage 120 (FIG. 3) includes a glider 130 clamped on a slider plate 140. The carriage 120 also includes first and second latches or latch parts 160 and 180, a release lever 200, and a spring assembly 210.

The glider 130 is preferably made from molded plastic and has two pairs of flanges (not shown) which slidably engage the opposite front walls 68 and 70, respectively, of the base 50. The flanges support the glider 130 on the base 50 for sliding movement relative to the base.

A lever window 132 is located in the upper portion of the glider 130. Below the lever window 132 the glider has a release lever pivot pin opening 134. Below the release lever pivot pin opening 134 is a spacer window 136. The glider 130 also has opposite upper and lower end portions 138 and 139 which project into the central passage 74 in the base 50. The upper and lower end portions 138 and 139 of the glider 130 clamp onto the slider plate 140. The glider 130 thus supports the slider plate 140 for sliding movement with the glider relative to the base 50.

The slider plate 140 (FIG. 3) is made from metal and has a planar configuration. A circular opening or window 142 in the slider plate 140 is aligned with the spacer window 136 in the glider 130. The slider plate 140 also has a an opening or latch window 144 that is aligned generally with the lever window 132 of the glider 130. The latch window 144 is substantially larger than the lever window 132 in the glider 130. The latch window 144 (FIG. 4) has a relatively wide upper portion 146 and a relatively narrow lower portion 148. The slider plate 140 has an upper edge surface 149 which forms the upper boundary of the latch window.

A spacer 150 extends into the spacer window 136 of the glider 130, from the front of the carriage 120. A support bolt 152 extends into the circular window 142 in the slider plate 140, from the back of the carriage 120, and is screwed into a nut 154. The support bolt 152 and nut 154 cooperate to clamp the slider plate 140 to the glider 130 so that the slider plate is supported on the base 50 for vertical movement with the glider and the support bolt. The D-ring 24 is pivotally mounted on the nut 154 for vertical movement with the support bolt 152.

The first and second latches 160 and 180 are disposed in the latch window 144 of the slider plate 140, on opposite sides of the axis 61. The latches 160 and 180 are made from steel.

The first latch 160 has a planar configuration. A U-shaped upper end portion 162 of the first latch 160 extends or wraps around the upper edge surface 149 of the latch window 144. The upper edge surface 149 forms a fulcrum about which the first latch 160 can pivot. The first latch 160 is, thereby, supported on the slider plate 140 for pivotal movement about a pivot axis 164, relative to the slider plate 140, the glider 130 and the base 50.

A main body portion 166 of the first latch 160 extends downward from the upper end portion 162. The main body portion 166 of the first latch 160 includes a nose 168 which has an arcuate lower end surface 170 centered on the pivot axis 164. A cam surface or back surface 167 of the first latch 160 faces the back wall 60 of the base 50. A release pin 172 projects from one side of the main body portion 166 of the first latch 160 (the left side as viewed in FIG. 4).

The second latch 180 (FIGS. 3 and 6) has a U-shaped upper end portion 182 which extends or wraps around the upper edge surface 149 of the latch window 144. The upper edge surface 149 forms a fulcrum about which the second latch 180 can pivot. The second latch 180 is, thereby, supported on the slider plate 140 for pivotal movement about the pivot axis 164, relative to the slider plate 140, the glider 130 and the base 50.

A main body portion 184 (FIG. 3) of the second latch 180 extends downward from the upper end portion 182. The main body portion 184 of the second latch 180 is substantially longer than the main body portion 166 of the first latch 160. A cam surface or back surface 185 of the second latch 180 faces the back wall 60 of the base 50.

The main body portion 184 of the second latch 180 includes a nose 186 which has an arcuate lower end surface 188 (FIG. 6) centered on the pivot axis 164. The nose 186 of the second latch 180 is thicker than the remainder of the second latch, as can be seen from FIG. 4. A release pin 190 projects from one side of the main body portion 184 of the second latch 180 (the right side as viewed in FIG. 4).

Figure 4:
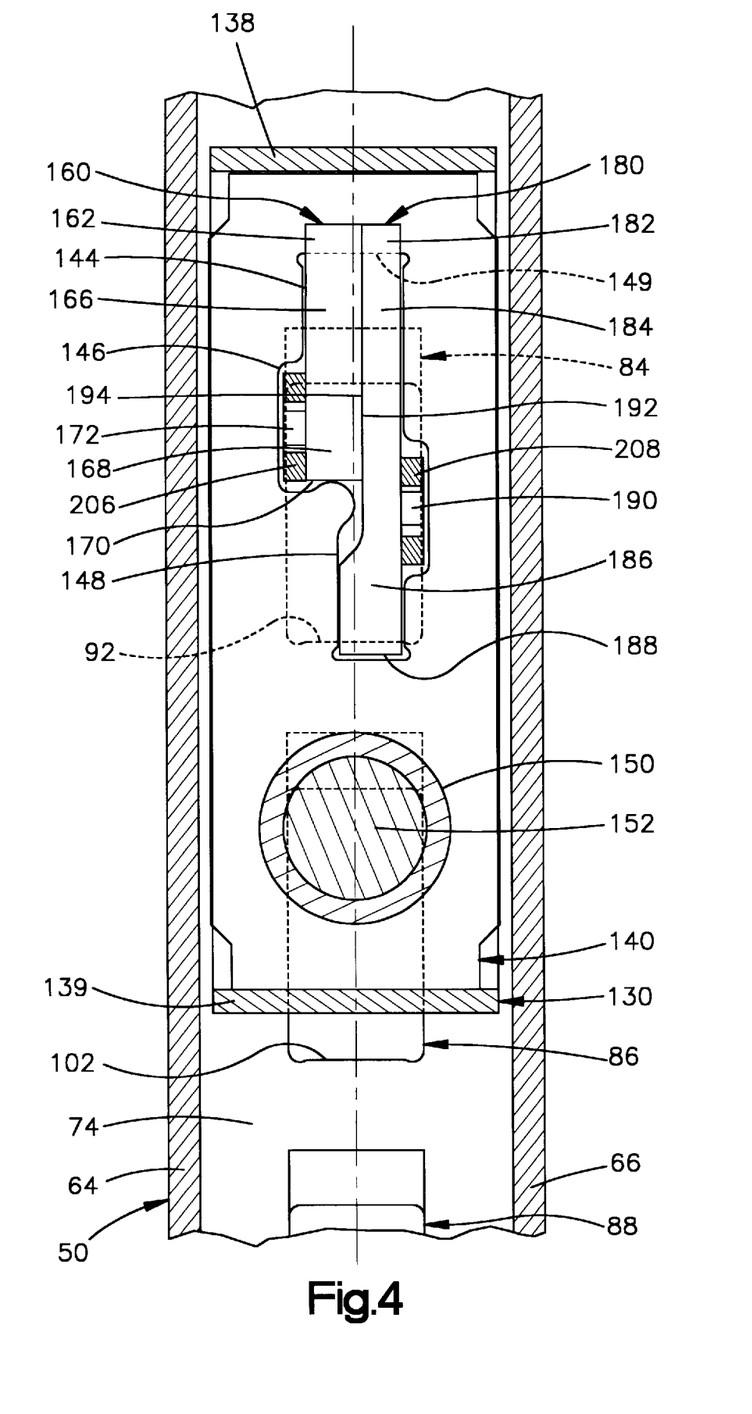
FIG. 4 is a front schematic view of a portion of the height adjuster of FIG. 1.

The first and second latches 160 and 180 are disposed side by side in the latch window 144 in the slider plate 140, on opposite sides of the axis 61. The slider plate 140 and the latches 160 and 180 are disposed in the central passage 74 in the base 50. The upper end portion 162 of the first latch 160 is aligned axially with the upper end portion 182 of the second latch 180. The release pins 172 and 190 on the first and second latches 160 and 180, respectively, face away from each other, and away from the axis 61. The release pin 172 on the first latch 160 is disposed above the release pin 190 on the second latch 180. Because the second latch 180 is substantially longer than the first latch 160, the nose 168 of the first latch is located a substantial distance above the nose 186 of the second latch.

The first latch 160 has an axially extending side surface 192 presented laterally inward toward the axis 61. The second latch 180 has an axially extending side surface 194 presented laterally inward toward the axis 61. The side surfaces 192 and 194 on the latches 160 and 180, respectively, thus face each other in a direction transverse to the longitudinal extent of the base 50 and transverse to the axis 61.

The release lever 200 (FIGS. 3–5) is manually engageable for moving the first and second latches 160 and 180 in a direction away from the back wall 60 of the base 50 to permit sliding movement of the carriage 120 relative to the base. The release lever 200 is disposed generally in the lever window 132 of the glider 130. The release lever 200 has a pivot pin 202. The pivot pin 202 is received in the release lever pivot pin opening 134 in the glider 130. The pivot pin 202 supports the release lever 200 for pivotal movement relative to the glider 130.

A manually engageable portion 204 of the release lever 200 is disposed in the vehicle occupant compartment, above the D-ring 24. The release lever 200 has two catch arms 206 and 208 which project into the central passage 74 in the base 50. The first catch arm 206 extends around the release pin 172 on the first latch 160. The second catch arm 208 extends around the release pin 190 on the second latch 180. Because the release pin 172 on the first latch 160 is disposed above the release pin 190 on the second latch 180, the first catch arm 206 on the release lever 200 is disposed above the second catch arm 208.

The spring assembly 210 acts between the glider 130 and the first and second latches 160 and 180, respectively. The spring assembly 210 is a one-piece metal member which includes first and second leaf springs 212 and 214. The first spring 212 acts between the glider 130 and the first latch 160. The first spring 212 biases the first latch 160 away from the glider 130 and the slider plate 140 in a direction toward the back wall 60 of the base 50 (to the right as viewed in FIGS. 3 and 5–9).

Figure 5:
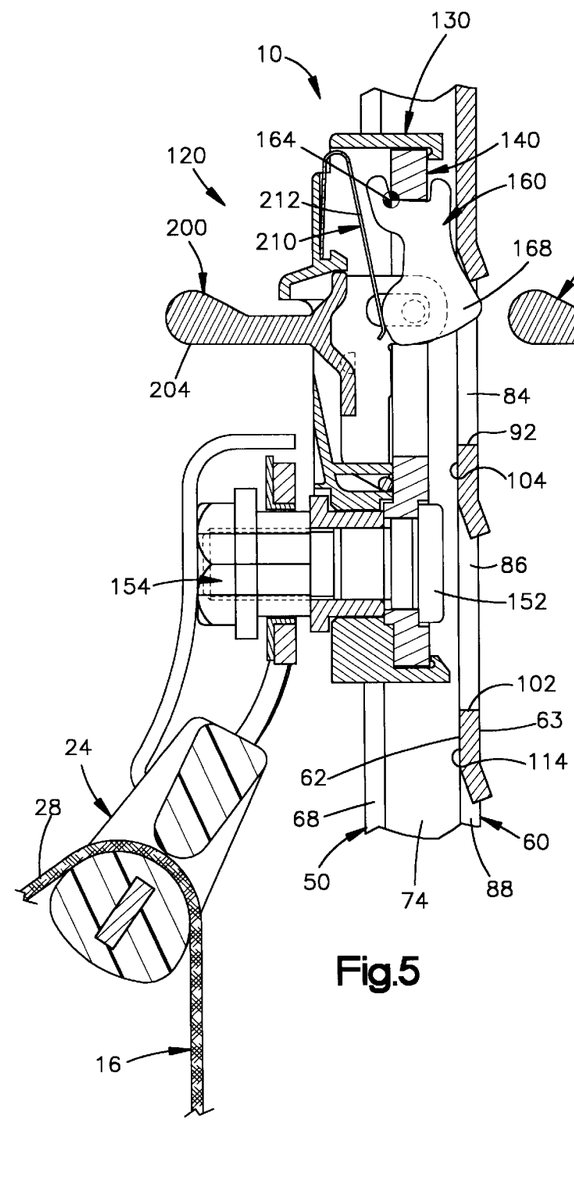
FIG. 5 is a longitudinal sectional view of the height adjuster of FIG. 1 showing parts of the height adjuster in a first condition.
Figure 6:
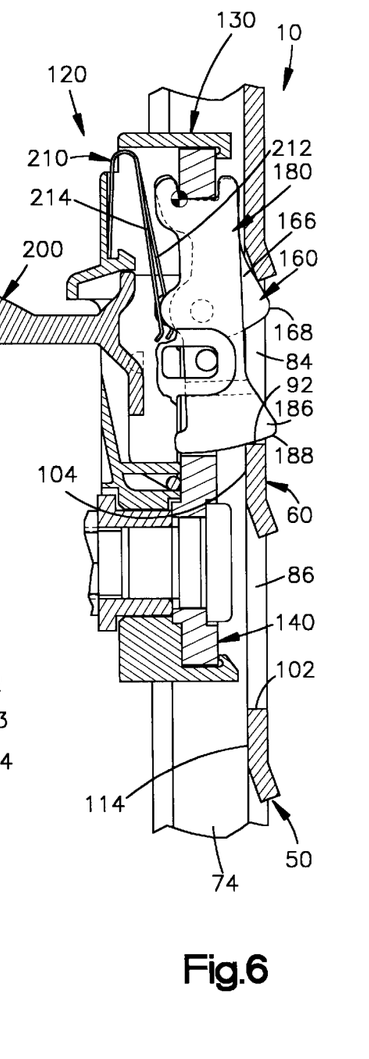
FIG. 6 is a longitudinal sectional view of the height adjuster of FIG. 1 showing different parts of the height adjuster in the first condition.

The second spring 214 acts between the glider 130 and the second latch 180. The second spring 214 biases the second latch 180 away from the glider 130 and the slider plate 140 in a direction toward the back wall 60 of the base 50 (to the right as viewed in FIGS. 3 and 5–9). The biasing force of the springs 212 and 214 is transmitted through the release pins 172 and 190 of the latches 160 and 180 to the release lever 200. This biasing force normally maintains the release lever 200 in an unactuated condition as shown in FIGS. 5 and 6.

Each one of the latches 160 and 180 has four possible conditions relative to the base 50, depending on whether the release lever 200 is actuated and depending on the vertical position of the carriage 120 relative to the base.

When the release lever 200 is actuated, that is, the manually engageable portion 204 is pressed down, the release lever pivots about the pivot pin 202. The catch arms 206 and 208 of the release lever 200 pull the latches 160 and 180 in a direction away from the back wall 60 of the base 50. The latches 160 and 180 are moved far enough away from the back wall 60 so that both latches are movable vertically without engaging the back wall and without entering into any of the latch openings 84–88, on the base 50. The latches 160 and 180 are in a "disengaged" condition, the first of the four possible conditions of the latches.

When the release lever 200 is not actuated, the springs 212 and 214 bias the latches 160 and 180, respectively, toward the back wall 60 of the base 50. Each one of the latches 160 and 180 has three possible conditions relative to the back wall and the latch openings 84–88 in the back wall, depending on the vertical position of the carriage 120 relative to the base 50. These are the remaining three of the four possible conditions of the latches 160 and 180.

The first of these three conditions is a "locking" condition. FIG. 6, as an example, illustrates the second latch 180 in the locking condition. The lower end surface 188 on the nose 186 of the second latch 180 is in abutting engagement with the lower end portion 92 of the edge surface 90 on the base 50. The position of the second latch 180 in the upper latch opening 84 immediately blocks downward movement of the second latch 180 relative to the base 50.

Figure 8:
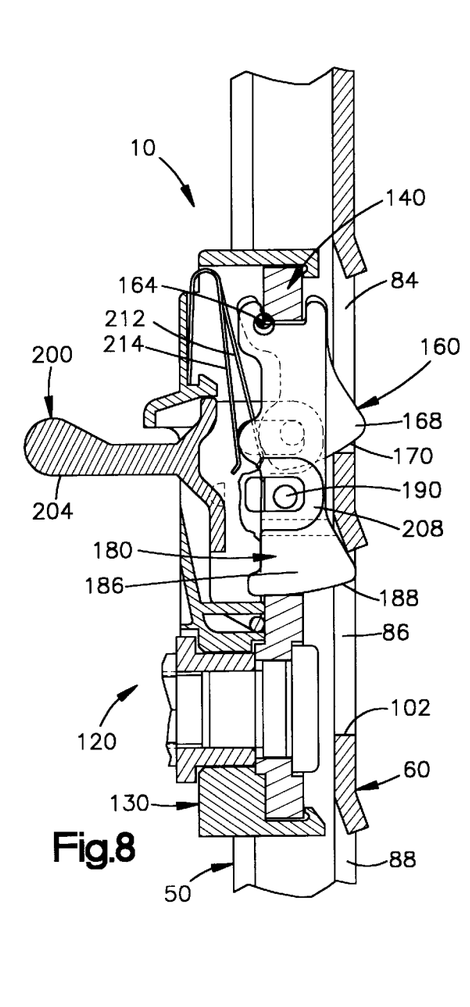
Figure 9:
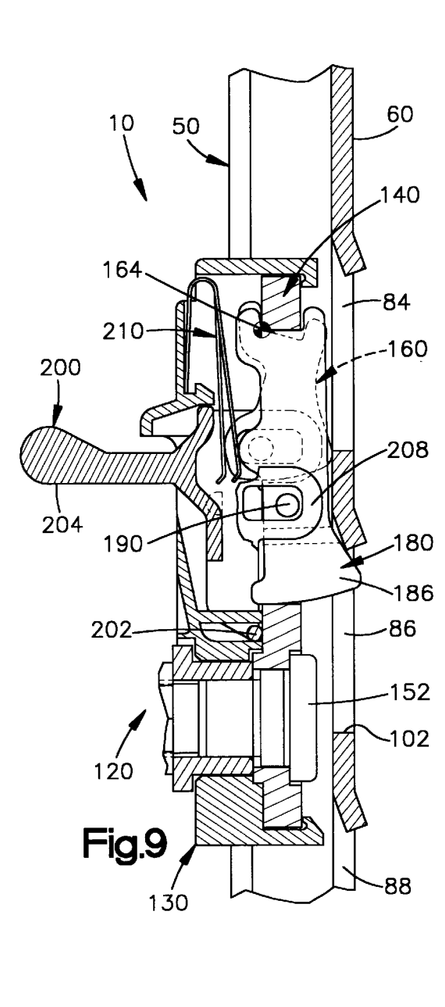

FIG. 2 also illustrates schematically the latches 160 and 180 in the locking condition. The block 180a in FIG. 2 represents the vertical position of the second latch 180 relative to the base 50 when the height adjuster 10 is in the condition shown in FIG. 6. The second latch 180 as illustrated by the block 180a is in a locking condition in the upper latch opening 84. The block 160c in FIG. 2 represents the position of the first latch 160 relative to the base 50 when the first latch 160 is in a locking condition in the upper latch opening 84. When the first latch is in the position represented by block 160c, the carriage is not in the position of FIG. 6. Rather, the carriage 120 is in another, different, vertical position relative to the base 50, as shown in FIG. 8.

The second of the three possible conditions in which each one of the latches 160 and 180 can be located, when the release lever 200 is not actuated, is a "ready" condition. A latch 160 or 180 is in an "engaged" condition when it is in either the ready condition or the locking condition. A latch 160 or 180 is in a ready condition when the nose of the latch is in one of the latch openings 84–88 but is not in the lower end portion of the one latch opening. FIGS. 5 and 6, as an example, illustrate the first latch 160 in the ready condition in the upper latch opening 84. The first latch 160 is not in a position immediately to block downward movement of the first latch relative to the base 50.

FIG. 2 also illustrates schematically the ready condition of the latches 160 and 180. The blocks 160a and 160b represent positions of the first latch 160, in a ready condition in the upper latch opening 84, when the carriage 120 is in two different vertical positions relative to the base 50. The second latch 180 is shown in two different vertical positions relative to the base 50, as represented by the blocks 180c and 180d, in a ready condition in the middle latch opening 86.

Figure 7:
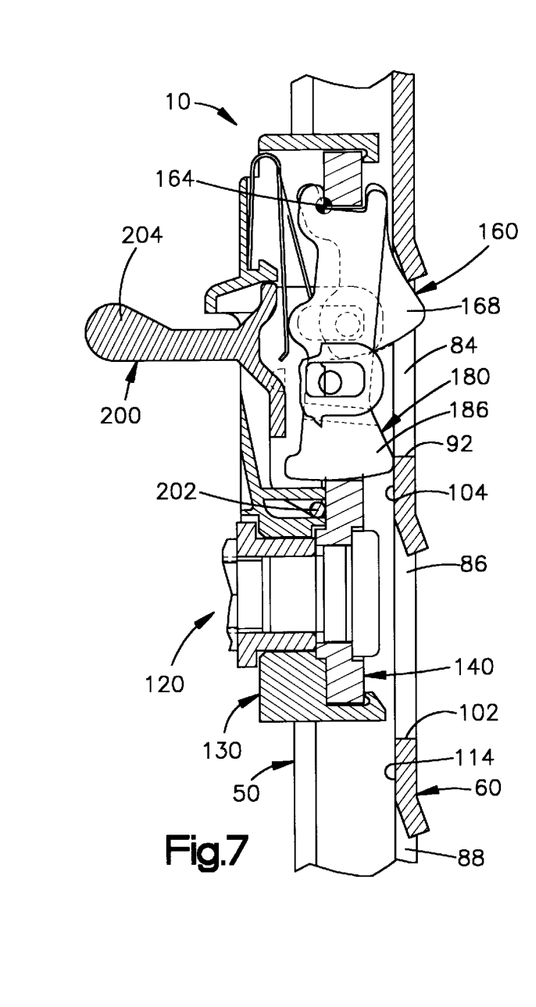
FIGS. 7–9 are a series of longitudinal sectional views of the height adjuster of FIG. 1, similar to FIG. 4, showing parts of the height adjuster in different conditions.

The third possible condition in which each one of the latches 160 and 180 can be located, when the release lever 200 is not actuated, is an "intermediate" condition. FIG. 7, as an example, illustrates the second latch 180 in the intermediate condition. The nose 186 of the second latch 180 is in abutting engagement with the portion 104 of the back wall 60 of the base 50, between the upper latch opening 84 and the middle latch opening 86. The second latch 180 is not in a position immediately to block downward movement of the second latch relative to the base 50. The first latch 160 is in a ready condition, as discussed above.

FIG. 2 also illustrates schematically intermediate positions of the latches 160 and 180. Block 160d represents the first latch 160 in an intermediate condition disposed vertically between the upper and middle latch openings 84 and 86, in engagement with the portion 104 of the inner side surface 62 of the back wall 60 of the base 50. Block 180b represents the second latch 180 in an intermediate condition when the carriage 120 is in a different vertical position relative to the base 50. The second latch 180 in this position is disposed vertically between the upper and middle latch openings 84 and 86, in engagement with the portion 104 of the inner side surface 62 of the back wall 60 of the base 50.

The height adjuster 10 is manually operable by an occupant of the vehicle seat 14 to adjust the vertical position of the D-ring 24. To adjust the vertical position of the D-ring 24 downward, the vehicle occupant actuates the release lever 200 by moving the manually engageable portion 204 of the release lever downward. The release lever 200 pivots relative to the glider 140 and pulls the first and second latches 160 and 180 away from the back wall 60 of the base 50. The first and second latches 160 and 180 simultaneously pivot to the disengaged condition, against the bias of the springs 212 and 214, respectively. The vehicle occupant does not need to raise the carriage 120 vertically to permit the latches 160 and 180 to move to the disengaged condition.

Because the second latch 180 is longer than the first latch 160, the nose 186 of the second latch would move a greater distance than the nose 168 of the first latch, if both latches were pivoted through the same angular amount (number of degrees). This undesired result is avoided because the release pin 190 on the second latch 180 is lower (that is, farther from the pivot axis 164) than the release pin 172 on the first latch 160. Thus, the second latch 180 is pivoted by the release lever 200 through a smaller angular amount (number of degrees), but its nose 186 moves the same lateral distance as the nose 168 of the first latch 160, enough to clear the back wall 60 of the base 50.

The downward force on the release lever 200 causes the slider plate 140 and the latches 160 and 180 to move vertically down the base 50. When the vehicle occupant thereafter releases the release lever 200, the springs 212 and 214 urge the latches 160 and 180 to pivot toward the back wall 60 of the base 50. The carriage 120 may or may not be in a locking position in which at least one of the latches 160 and 180 is in the locking condition, as described above.

In the event of vehicle deceleration above a predetermined threshold level, electric circuitry (not shown) of the vehicle actuates the pretensioner 40 in a known manner. The pretensioner 40 tightens the torso portion 28 of the belt webbing 16 about the vehicle occupant and reduces slack in the belt webbing. The force on the torso portion 28 of the belt webbing 16 is transmitted through the D-ring 24 into the carriage 120, the slider plate 140, and the latches 160 and 180.

If either one of the latches 160 and 180 is in the locking condition when the pretensioner 40 is actuated, that is, if the height adjuster 10 is locked, then the D-ring 24 can not move downward by any significant amount. Downward movement of the carriage 120 is blocked by the engaged latch 160 or 180. The belt webbing 16 is rapidly tensioned and is tightened about the torso of the vehicle occupant.

It may happen that neither the first latch 160 nor the second latch 180 is in the locking condition when the pretensioner 40 is actuated. In this case, the height adjuster 10 is not locked. If the height adjuster 10 is not locked when the pretensioner 40 is actuated, the tensile force in the belt webbing 16 causes the D-ring 24 to pull the carriage 120 downward along the base 50 until the nose of one of the first and second latches 160 or 180 engages one of the edge surfaces 92, 102, or 112 on the base 50. When this engagement occurs, the height adjuster 10 locks. This downward movement takes a small amount of time and results in a slight delay in the tensioning of the belt webbing 16.

This delay is minimized by the staggered relationship of the noses 168 and 186 of the two latches 160 and 180, respectively—that is, the position of the nose of the second latch substantially below the nose of the first latch. Because of this staggered relationship, one of the two latches 160 and 180 is always in the ready condition. In other words, the nose of the one latch 160 or 180 is always in one of the latch openings 84–88 in the back wall 60 of the base 50, in a position to engage that latch opening's edge surface upon downward movement of the D-ring 24. This is the case even if the other one of the two latches 160 and 180 is in the intermediate position, with its nose engaging the inner major side surface 62 of the back wall 60 of the base 50.

For example, prior to actuation of the pretensioner 40, the second latch 180 (represented by the block 180b in FIG. 2) may be in the intermediate condition, resting on the inner side surface 62 of the back wall 60 of the base 50. The second latch 180 would need to move laterally, that is, in a direction toward the back wall 60 of the base 50 and into the middle latch opening 86, in order to be in a position to lock in the middle latch opening. The only force for moving the second latch 180 laterally from the intermediate condition into the middle latch opening 86 comes from the second spring 214. If the downward acceleration of the carriage 120 due to the pretensioner 40 were sufficiently great, the biasing force of the second spring 214 might be insufficient to overcome the inertia of the second latch 180 and move the second latch fully into the middle latch opening 86 before the second latch reaches the lower end portion 102 of the edge surface 100 defining the middle latch opening. Thus, there could be insufficient engagement of the second latch 180 in the middle latch opening 86 to prevent further axial movement of the second latch. The second latch 180 might, therefore, skip past the middle latch opening 86.

Because of the staggered relationship of the noses 168 and 186 of the first and second latches 160 and 180, however, the first latch 160 (FIG. 6) is in the ready condition in the upper latch opening 84 when the second latch 180 is in the intermediate condition between the upper and middle latch openings 84 and 86. Downward movement of the D-ring 24, in response to actuation of the pretensioner 40, pulls the first latch 160 down into engagement with the lower end portion 92 of the edge surface 90 which defines the upper latch opening 84. This engagement occurs without the need for any lateral movement of the first latch 160 in a direction toward the back wall 60 of the base 50 or into the upper latch opening 84. As a result, the height adjuster 10 locks in the next downward locking position, that is, when the first latch 160 engages the lower end portion 92 of the edge surface 90 which defines the upper latch opening 84. This engagement blocks further downward movement of the first latch 160 and, therefore, of the carriage 120 and the D-ring 24. The delay in tensioning of the belt webbing 16 is reduced because the height adjuster 10 locks in the next downward locking position.

Upward adjustment of the D-ring 24 on the height adjust 10 does not require actuation of the release lever 200. Upwardly directed force on the release lever 200 causes the carriage 120 to move upward. The edge surfaces defining the latch openings 84–88 on the base 50 engage the back surfaces 167 and 185 of the latches 160 and 180, respectively, and cam the latches away from the back wall 60 to allow relatively unrestricted upward movement of the carriage 120.

Figure 10:
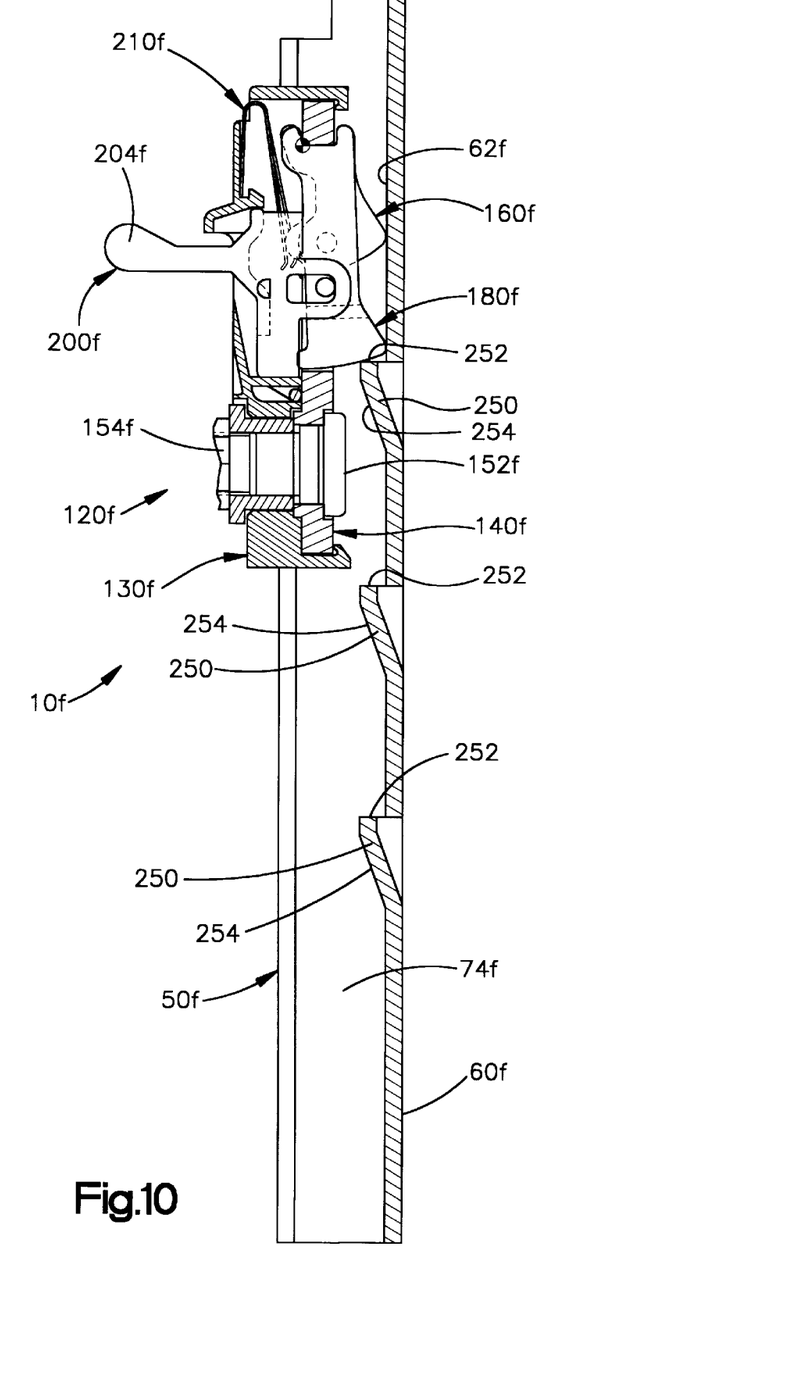
FIG. 10 is a view similar to FIG. 4 of a height adjuster constructed in accordance with a second embodiment of the present invention.

FIG. 10 illustrates a height adjuster 10$f$ constructed in accordance with a second embodiment of the present invention. The height adjuster 10$f$ is similar in construction to the height adjuster 10 (FIGS. 1–9). The height adjuster 10$f$ includes a carriage 120$f$ which is identical in construction to the carriage 120 of the height adjuster 10.

In the height adjuster 10$f$, the locking features on the base 50$f$ are projections 250 on the back wall 60$f$ rather than openings in the back wall of the base. In the illustrated embodiment, three projections 250 are formed on the base 50$f$. Each one of the projections 250 is formed by deforming a portion of the material of the back wall 60$f$ of the base 50$f$ into the central passage 74$f$ in the base. The projections 250 are centered laterally on the axis 61$f$ (not shown) of the height adjuster 10$f$.

Each one of the projections 250 has at its upper end a planar blocking surface 252 oriented perpendicular to the axis 61$f$. Each one of the projections 250 also has a curved outer side surface 254 which tapers from the blocking surface 252 in a downward direction to merge into the major side surface 62$f$ of the back wall 60$f$. The major side surface 62$f$ of the back wall 60$f$ is exposed in the gaps between the projections 250.

Each one of the latches 160$f$ and 180$f$ has four possible conditions relative to the base 50$f$, depending on whether the release lever 200$f$ is actuated and depending on the vertical position of the carriage 120$f$ relative to the base. The four possible conditions of the latches 160$f$ and 180$f$ correspond to the four possible conditions of the latches 160 and 180 of the height adjuster 10 (FIGS. 1–9).

The first condition is a "disengaged" condition. When the release lever 200$f$ is actuated, that is, the manually engageable portion 204$f$ is pressed down, the release lever pulls the latches 160$f$ and 180$f$ in a direction away from the back wall 60$f$ of the base 50$f$. The latches 160$f$ and 180$f$ are moved far enough away from the back wall 60$f$ so that both latches are movable vertically without engaging the back wall and without engaging any of the projections 250 on the base 50$f$. The latches 160$f$ and 180$f$ are in the disengaged condition.

When the release lever 200$f$ is not actuated, the spring assembly 210$f$ biases the latches 160$f$ and 180$f$, respectively, into engagement with the back wall 60$f$ of the base 50$f$. Each one of the latches 160$f$ and 180$f$ has three possible conditions relative to the back wall and the projections 250, depending on the vertical position of the carriage 120$f$ relative to the base 50$f$.

The first of these three conditions is a "locking" condition. When one of the latches 160$f$ or 180$f$ is in the locking condition, the nose of the one latch is in engagement with the engagement surface 252 of one of the projections 250. The latch 160$f$ or 180$f$ blocks downward movement of the carriage 120$f$ relative to the base 50$f$.

The second of the three possible conditions in which each one of the latches 160$f$ and 180$f$ can be located, when the release lever 200$f$ is not actuated, is a "ready" condition. A latch 160$f$ or 180$f$ is in a ready condition when the nose of the latch is not in engagement with the blocking surface 252 of one of the projections 250 but is in abutting engagement with the inner side surface 62$f$ of the back wall 60$f$ of the base 50$f$. FIG. 10, as an example, illustrates the first latch 160$f$ in the ready condition relative to the upper most projection 250.

The third possible condition in which each one of the latches 160$f$ and 180$f$ can be located, when the release lever 200$f$ is not actuated, is an "intermediate" condition (not shown). In this condition, a latch 160$f$ or 180$f$ is in abutting engagement with the outer side surface 254$f$ of one of the projections 250, and is not in a position immediately to block downward movement of the latch relative to the base 50$f$.

The operation of the height adjuster 10$f$ is similar to the operation of the height adjuster 10. If either one of the latches 160$f$ and 180$f$ is in the locking condition when the pretensioner 40 is actuated, that is, in engagement with a blocking surface 252 of one of the projections 250 on the base 50$f$, then downward movement of the carriage 120$f$ is blocked by the engaged latch 160$f$ or 180$f$. The belt webbing 16 is rapidly tensioned and is tightened about the torso of the vehicle occupant.

If the height adjuster 10$f$ is not locked when the pretensioner 40 is actuated, the tensile force in the belt webbing 16 causes the D-ring 24 to pull the carriage 120$f$ downward along the base 50$f$ until the nose of one of the first and second latches 160$f$ or 180$f$ engages one of the blocking surfaces 252 on one of the projections 250 of the base 50$f$. When this engagement occurs, the height adjuster 10 locks. This downward movement takes a small amount of time and results in a slight delay in the tensioning of the belt webbing 16.

This delay is minimized by the staggered relationship of the noses of the two latches 160$f$ and 180$f$—that is, the position of the nose of the second latch 180$f$ substantially below the nose of the first latch 160$f$. Because of this staggered relationship, one of the two latches 160$f$ and 180$f$ is always in the ready condition—that is, the nose of the one latch is in a position to engage a projection 250 upon downward movement of the D-ring 24 without moving laterally relative to the base 50f. As a result, the height adjuster 10a locks in the next downward locking position to block further downward movement of the carriage 120f and the D-ring 24.

From the above description of the invention, those skilled in the art will perceive improvements, changes and modifications in the invention. For example, the height adjuster can be mounted on another portion of the vehicle, such as the seat frame. The base 50 can be curved to match curvature of the B-pillar. The base 50 can be of the type mounted with a single bolt at the top and two hooks at the lower end. More than three latch openings, or fewer than three, can be provided. In addition, the height adjuster 10 may include a detent mechanism (not shown) for ensuring that when the vehicle occupant releases the release lever 200, at least one of the latches 160 and 180 is in the locking condition.

Further, although the release lever 200 preferably operates in response to a downward force on and downward movement of the manually engageable portion 204, the required motion of the catch arms can also be achieved by other motions, such as rotary motion of a manually engageable portion of the release lever 200 about a generally horizontal axis. Such operation of the release lever 200 would require the addition of an intermediate cam mechanism to the release lever. Such improvements, changes and modifications within the skill of the art are intended to be covered by the appended claims.

Having described the invention, I claim:

1. A seat belt webbing height adjuster comprising:

a base having a column of openings spaced along an axis;

a carriage supported on said base for movement along said axis relative to said base, and a seat belt webbing guide on said carriage;

a first latch part on said carriage, said first latch part being movable between a first condition in which said first latch part is not located in any one of said openings and a second condition in which said first latch part is located in one of said openings to block axial movement of said first latch part and said carriage relative to said base;

a second latch part on said carriage, said second latch part being movable between a first condition in which said second latch part is not located in any one of said openings and a second condition in which said second latch part is located in one of said openings to block axial movement of said second latch part and said carriage relative to said base;

said first and second latch parts being configured and disposed on said carriage so as to be capable of locating in the same opening simultaneously;

biasing means for biasing said first and second latch parts into the second condition; and actuatable release means for moving said first and second latch parts to the first condition;

said first and second latch parts being movable from the second condition into the first condition in response to upward movement of said carriage relative to said base when said release means is unactuated;

said second latch part being substantially longer than said first latch part.

2. A seat belt webbing height adjuster comprising:

a base having a column of openings spaced apart along an axis;

a carriage supported on said base for movement along said axis relative to said base;

a seat belt webbing guide on said carriage;

a first latch part on said carriage, said first latch part being pivotally movable between a first condition in which said first latch part is not located in any one of said openings and a second condition in which said first latch part is located in one of said openings to block axial movement of said first latch part and said carriage relative to said base;

a second latch part on said carriage, said second latch part being pivotally movable between a first condition in which said second latch part is not located in any one of said openings and a second condition in which said second latch part is located in one of said openings to block axial movement of said second latch part and said carriage relative to said base;

said first and second latch parts being disposed next to each other on said carriage so as to be capable of locating in the same openings simultaneously;

biasing means for biasing said first and second latch parts into the second condition; and actuatable release means for moving said first and second latch parts to the first condition;

at least one of said first and second latch parts being located in one of said openings in said base when said release means is unactuated, said second latch part being substantially longer than said first latch part.

3. A height adjuster as set forth in claim 2 wherein said first and second latch parts are pivotable about a common pivot axis.

4. A seat belt webbing height adjuster comprising:

a base having a column of openings spaced apart along an axis;

a carriage supported on said base for movement along said axis relative to said base;

a seat belt webbing guide on said carriage;

a first latch part on said carriage, said first latch part being pivotally movable between a first condition in which said first latch part is not located in any one of said openings and a second condition in which said first latch part is located in one of said openings to block axial movement of said first latch part and said carriage relative to said base;

a second latch part on said carriage, said second latch part being pivotally movable between a first condition in which said second latch part is not located in any one of said openings and a second condition in which said second latch part is located in one of said openings to block axial movement of said second latch part and said carriage relative to said base;

said first and second latch parts being disposed next to each other on said carriage so as to be capable of locating in the same openings simultaneously;

biasing means for biasing said first and second latch parts into the second condition; and actuatable release means for moving said first and second latch parts to the first condition;

at least one of said first and second latch parts being located in one of said openings in said base when said release means is unactuated, said first latch part having a nose which is engageable with said base to block downward movement of said first latch part along said base, said second latch part having a nose which is engageable with said base to block downward movement of said second latch part along said base, and said nose of said second latch part being disposed below said nose of said first latch part.

5. A seat belt webbing height adjuster comprising:

a base having a column of openings spaced along an axis;

a carriage supported on said base for movement along said axis relative to said base, and a seat belt webbing guide on said carriage;

a first latch part on said carriage, said first latch part being movable between a first condition in which said first latch part is not located in any one of said openings and a second condition in which said first latch part is located in one of said openings to block axial movement of said first latch part and said carriage relative to said base;

a second latch part on said carriage, said second latch part being movable between a first condition in which said second latch part is not located in any one of said openings and a second condition in which said second latch part is located in one of said openings to block axial movement of said second latch part and said carriage relative to said base;

said first and second latch parts being configured and disposed on said carriage so as to be capable of locating in the same opening simultaneously;

biasing means for biasing said first and second latch parts into the second condition; and actuatable release means for moving said first and second latch parts to the first condition;

said actuatable release means having an unactuated condition in response to being pressed in a direction upward, parallel to the longitudinal extent of said base and parallel to said axis, said actuatable release means having an actuated condition in response to being pressed downward, parallel to the longitudinal extent of said base and parallel to said axis, said first and second latch parts being movable from the second condition into the first condition in response to upward movement of said carriage relative to said base when said release means is unactuated.

6. A height adjuster as set forth in claim 5 wherein said first and second latch parts are located side by side.

7. A height adjuster as set forth in claim 6 wherein said first latch and second latch parts have axially extending side surfaces in which said first latch part side surface faces said second latch part side surface in a direction parallel to the longitudinal extent of said base and parallel to said axis.

8. A height adjuster as set forth in claim 5 wherein said second latch part is substantially longer than said first latch part.

9. A height adjuster as set forth in claim 5 wherein said first latch part has a nose which is engageable with said base to block downward movement of said first latch part along said base, said second latch part has a nose which is engageable with said base to block downward movement of said second latch part along said base, and said nose of said second latch part is disposed below said nose of said first latch part.

10. A height adjuster as set forth in claim 8 wherein the axial position of said openings in said base is selected so that at least one of said first and second latch parts is located in one of said openings in said base when said release means is unactuated.

11. A height adjuster as set forth in claim 5 wherein each one of said openings is defined by a respective edge surface on said base, each one of said edge surfaces having a respective lower end portion, each one of said latch parts being engageable with a selected one of said lower end portions of said edge surfaces to block downward movement of said carriage relative to said base.

12. A height adjuster as set forth in claim 5 wherein said first and second latch parts are independently movable first and second latches.

13. A height adjuster as set forth in claim 12 wherein said biasing means comprises a first spring member in engagement with said first latch for biasing said first latch into the second condition and a second spring member in engagement with said second latch for biasing said second latch into the second condition independently of said first latch.

14. A seat belt webbing height adjuster comprising:

a base having a column of openings spaced apart along an axis;

a carriage supported on said base for movement along said axis relative to said base;

a seat belt webbing guide on said carriage;

a first latch part on said carriage, said first latch part being pivotally movable between a first condition in which said first latch part is not located in any one of said openings and a second condition in which said first latch part is located in one of said openings to block axial movement of said first latch part and said carriage relative to said base;

a second latch part on said carriage, said second latch part being pivotally movable between a first condition in which said second latch part is not located in any one of said openings and a second condition in which said second latch part is located in one of said openings to block axial movement of said second latch part and said carriage relative to said base;

said first and second latch parts being disposed next to each other on said carriage so as to be capable of locating in the same openings simultaneously;

biasing means for biasing said first and second latch parts into the second condition; and actuatable release means for moving said first and second latch parts to the first condition;

at least one of said first and second latch parts being located in one of said openings in said base when said release means is unactuated, said first and second latch parts being pivotally moveable about a common pivot axis in opposite directions and independent of each other.

15. A height adjuster as set forth in claim 14 wherein said second latch part is substantially longer than said first latch part.

16. A height adjuster as set forth in claim 14 wherein said first latch part has a nose which is engageable with said base to block downward movement of said first latch part along said base, said second latch part has a nose which is engageable with said base to block downward movement of said second patch part along said base, said nose of said second latch part is disposed below said nose of said first latch part.

17. A height adjuster as set forth in claim 14 wherein first and second latch parts have respective cam surfaces which are engageable with said base upon upward movement of said carriage relative to said base to move said first and second latch parts into the first condition.

18. A height adjuster as set forth in claim 14 wherein said first and second latch parts have axially extending side surfaces in which said first latch part side surface faces said second latch part side surface in a direction parallel to the longitudinal extent of said base and parallel to said axis.

* * * * *